United States Patent [19]

Langer et al.

[11] Patent Number: 4,736,498
[45] Date of Patent: Apr. 12, 1988

[54] TENTERING CHAIN GUIDE TRACK FOR ROLLER-SUPPORTED TENTER CLAMPS

[75] Inventors: Rudolf Langer, Lindau; Karl H. Kosziech, Friedrichshafen, both of Fed. Rep. of Germany

[73] Assignee: Lindauer Dornier Gesellschaft mbH, Lindau, Fed. Rep. of Germany

[21] Appl. No.: 99,656

[22] Filed: Sep. 21, 1987

Related U.S. Application Data

[63] Continuation of Ser. No. 893,480, Aug. 5, 1986, abandoned.

[30] Foreign Application Priority Data

Aug. 17, 1985 [DE] Fed. Rep. of Germany ....... 3529514

[51] Int. Cl.⁴ .............................................. D06C 3/04
[52] U.S. Cl. .............................................. 26/93; 26/91
[58] Field of Search ........................... 26/73, 91, 93, 95

[56] References Cited

U.S. PATENT DOCUMENTS

| | | | |
|---|---|---|---|
| 3,391,421 | 7/1968 | D'Onofrio et al. | 26/73 |
| 3,469,291 | 9/1969 | Gageur | 26/93 |
| 3,638,289 | 2/1972 | Dornier et al. | 26/93 |
| 4,176,429 | 12/1979 | Rottensteiner | 26/93 |

FOREIGN PATENT DOCUMENTS

| | | |
|---|---|---|
| 1925284 | 11/1970 | Fed. Rep. of Germany . |
| 1635250 | 6/1971 | Fed. Rep. of Germany . |
| 2558765 | 3/1977 | Fed. Rep. of Germany . |
| 2317076 | 2/1977 | France ................................... 26/73 |
| 51-31275 | 9/1976 | Japan ..................................... 26/91 |
| 59-135127 | 8/1984 | Japan ..................................... 26/93 |

*Primary Examiner*—Robert R. Mackey
*Attorney, Agent, or Firm*—W. G. Fasse; D. H. Kane, Jr.

[57] ABSTRACT

The guide track for a tentering chain carrying roller-supported tenter clips or clamps has two band-shaped flexible parallel guide rails extending horizontally along the edge of a material web, but protruding in an upright or on-edge manner perpendicular to the material web. The tenter clips have running rollers arranged in the material tentering plane and contacting respective opposite vertical surfaces of the guide rail arranged closer to the material web for taking up horizontal forces. The tenter clip reaches around the two guide rails in a C-shape so that an upper support roller contacts the upper edge of the guide rail lying closer to the material web for supporting the weight of the tenter clip and so that a lower support roller contacts the lower edge of the other guide rail for taking up any tipping or tilting moments of the tenter clip.

11 Claims, 3 Drawing Sheets

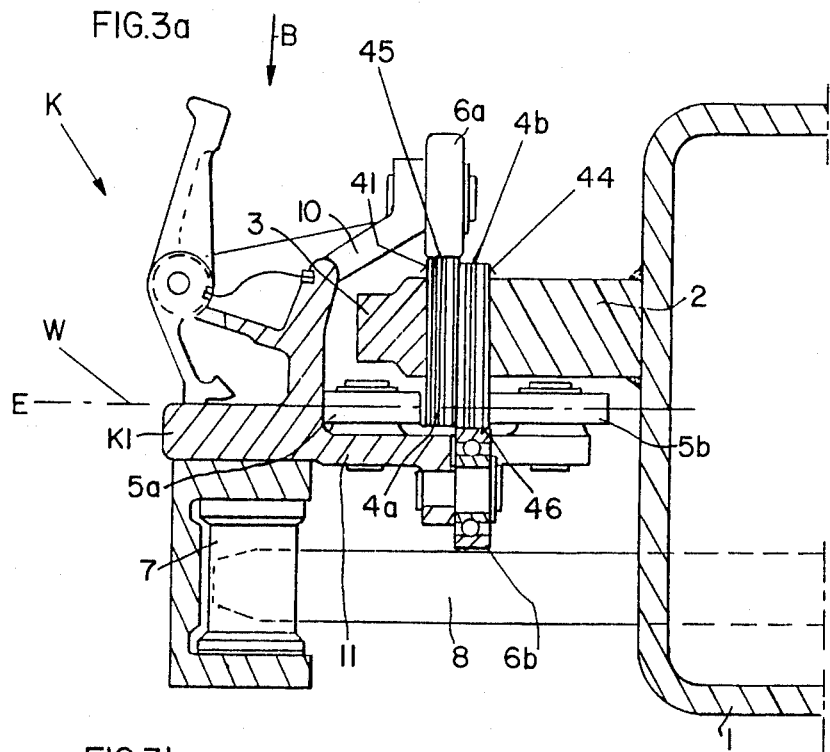
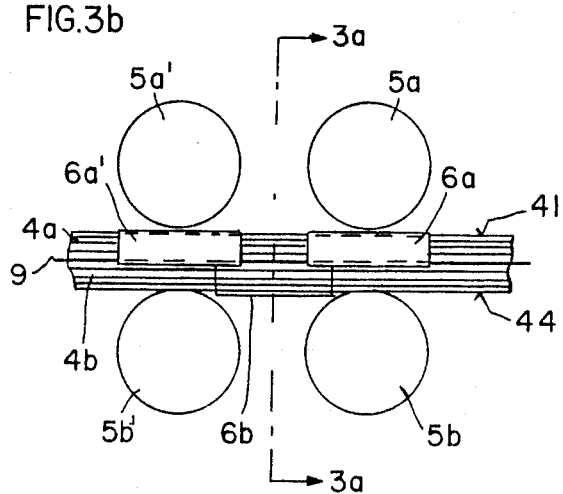

TENTERING CHAIN GUIDE TRACK FOR ROLLER-SUPPORTED TENTER CLAMPS

This application is a continuation, of application Ser. No. 893,480, filed Aug. 5, 1986, now abandoned.

FIELD OF THE INVENTION

The invention relates to a tentering chain guide track for tenter clips or clamps supported by rollers in a tentering frame. Such a tentering frame allows the continuous treatment of a material web, especially a film web in a so-called film stretching machine.

DESCRIPTION OF THE PRIOR ART

Such tentering chain guide tracks typically include flexible endless-band-shaped guide rails arranged perpendicularly to the material web. The riding or running rollers of the tentering clips which take up the horizontal forces, cooperate with the vertical surface of the guide rail facing the material web as well as with the opposite vertical surface of the guide rail. The support rollers which take up the vertical forces are supported by the upper edge of the guide rail.

A tentering chain guide track having a flexible upright or on-edge clamped guide rail is known, for example from German patent Publication (DE-PS) 1,635,250, disclosing a tentering chain guide track having a vertically clamped guide rail, whereby the two vertical sides of the guide rail serve as running surfaces for the rollers which take up the horizontal tension forces. The running rollers bear or press against both sides of the guide rail. Any vertical forces, that is, essentially the weight of the tentering chain, is taken up by special rollers which are supported by a horizontal portion of a chain track carrier. Running surfaces for the horizontal rollers are provided both above and below the clamping line on both sides of the guide rail because the guide rail is clamped along its midline, whereby a tipping of the tentering clips is prevented. However, the described vertical support of the tentering clips on the chain track carrier itself is not advantageous in operation and requires special measures at abutting ends of adjacent chain carrier sections, so that the rollers can pass these abutting ends.

In a tentering chain guide track disclosed in the German patent Publication (DE-PS) 1,925,284, flexible, vertical guide rails are similarly arranged on-edge, whereby the running rollers for taking up the horizontal tension forces bear against the guide rails. Instead of a single guide rail, a pair of guide rails is provided so that the running rollers of the tenter clips move between the two guide rails of the pair. The running rollers thereby contact one or the other opposed guide rail, depending on the direction of the arising horizontal forces. A disadvantage is seen in that the rotation direction of the running rollers must reverse each time the rollers contact the opposite guide rail. The tenter clips are shaped so that they enclasp the vertically protruding guide rail from above and so that the weight of the tenter clips is supported by a roller contacting the narrow upper edge of the guide rail. The tenter clips can tip or tilt about their vertical support point. The resulting tilting moments must be taken up or controlled by the running rollers arranged between the two guide rails, whereby the running rollers alternately contact one or the other of the guide rails which leads to the above mentioned disadvantageous reversal of the running direction of the rollers.

Another version of a tentering chain guide track is known from the German patent Publication (DE-PS) 2,558,765, wherein the weight of the tentering clips is supported by rollers which ride on the upper edge of a flexible or bendable guide rail. The horizontal forces are again taken up by running rollers which contact both side surfaces of the flexible guide rail. These running rollers must also take up tilting moments of the tentering clips. Typically, eight horizontal running rollers and one to two vertical rollers are provided for each tenter clip.

The above described conventional tenter chain tracks do exhibit a number of advantages. However, it has been shown to be a disadvantage in operation when the tilting moments of the tenter clips are transmitted to and must be taken up by the horizontal rollers. Besides, a symmetric arrangement of the horizontal running rollers is required for this purpose, whereby the number of required rollers cannot be less than a prescribed lower limit. Due to the higher number of rollers, the production costs, as well as the costs for the maintenance of the tentering chain tracks is considerably increased, whereby the economy of such a chain track is reduced. Furthermore, several conventional tentering chains remain plagued by problems at the input of the drive power where the guide rail for the tentering chain must be cut or omitted in the region of the chain drive sprocket for driving the tentering chain.

OBJECTS OF THE INVENTION

In view of the foregoing, it is the aim of the invention to achieve the following objects singly or in combination:

to maintain the advantages of prior art tentering chain guide tracks with roller supports while avoiding their disadvantages;

to prevent forces resulting from tilting of the tenter clips, from acting on the horizontal running rollers; and to make sure that these forces do not adversely affect the running characteristics of the rollers;

to achieve an effective and uniform distribution of horizontal tension forces by means of an advantageous arrangement of a small number of tenter chain rollers, whereby the number of rollers required for each tentering clip is optimally low;

to avoid a direction reversal of the running rollers of such a tentering chain;

to reduce the problem of fitting the guide track to a chain drive sprocket in such a tentering chain guide track; and to construct a tentering chain guide track as simple as possible to reduce its cost and to assure low maintenance requirements.

SUMMARY OF THE INVENTION

The above objects have been achieved in a tentering chain guide track for roller supported tenter clips in a tentering frame according to the invention. The tentering chain guide track of the invention has two flexible endless-band-shaped guide rails. A first guide rail is arranged above the material tentering plane on the side of the tentering clips opposite the material web in such a position that the contact surfaces for the running rollers which take up the horizontal forces, lie in the level of said material tentering plane. Upper support rollers of the tenter clips contact and run along the upper edge of the first guide rail. A second guide rail is arranged in parallel to the first guide rail on the side away from the material web. Lower support rollers for taking up any arising tilting moments of the tenter clips contact the lower edge of the second support rail.

The two parallel guide rails of the invention may be arranged close together or a spacing falling into a substantial spacing range may be provided between the parallel guide rails. Each tenter clip has an upper and a lower arm or shank with which it reaches around the guide rail arrangement respectively from above and below. Support rollers for taking up the vertical forces and the tilting moments, as well as running rollers for taking up the horizontal forces arising during operation as described above, are arranged on these arms. Each tenter clip includes at least one, or to greater advantage two, upper support rollers which roll along the upper edge of the first guide rail for carrying the weight of the tenter clips. Generally, a single lower support roller is sufficient as a counter-roller on the lower edge of the other guide rail. The running rollers for taking up the horizontal forces are arranged on the lower shank of the tenter clip body in the level of the material tentering plane. Furthermore, at least one running roller is provided on the running surface of the guide rail facing the material web and two running rollers are arranged on the opposite running surface of the guide rail facing away from the material web.

BRIEF DESCRIPTION OF THE DRAWINGS:

In order that the invention may be clearly understood, it will now be described, by way of example, with reference to the accompanying drawings, wherein:

FIG. 3a is a cross-section through a further embodiment of a tentering chain guide track having guide rails placed close together; and FIG. 3b is a top view schematic in the direction of arrow B in FIG. 3a showing the arrangement of the guide rails and rollers of a tenter clip of FIG. 3a.

Figure 1A:
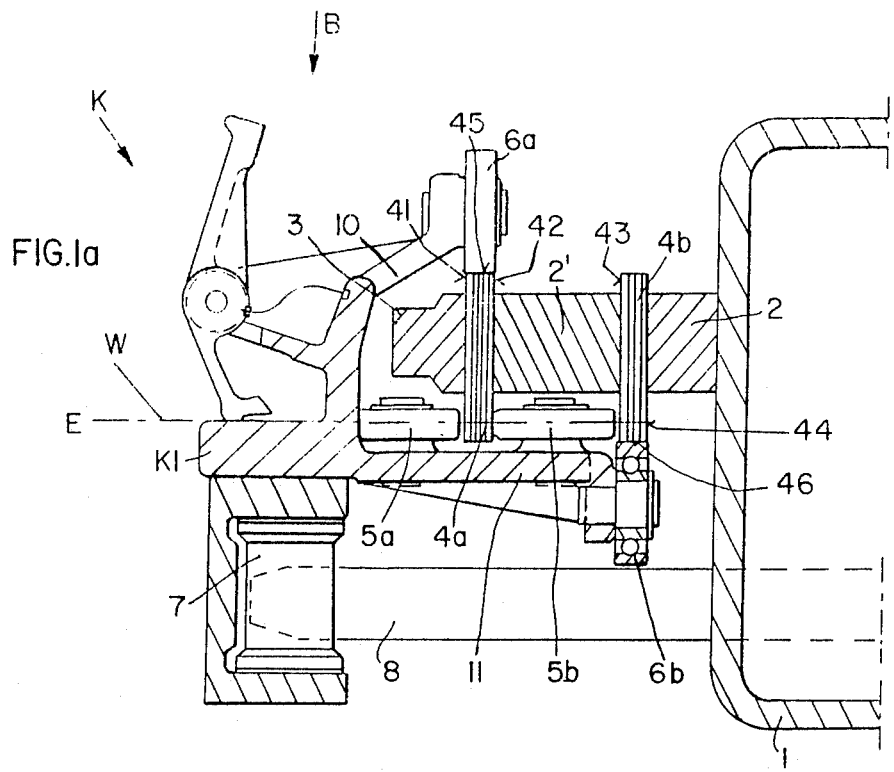
FIG. 1a is a cross-section through a tentering chain guide track with tenter clips, according to the invention

DETAILED DESCRIPTION OF PREFERRED EXAMPLE EMBODIMENTS AND OF THE BEST MODE OF THE INVENTION:

First, the principle arrangement and structure of the tentering chain guide track according to the invention will be described with reference to FIGS. 1a and 1b, whereby the cross-sectional view of FIG. 1a is a view along section line 1a-1a of the simplified top view of FIG. 1b. Flexible or bendable guide rails 4a and 4b are connected by means of clamping or mounting members 3 and support struts 2 in a known manner to a chain track carrying member 1. Since this type of setting the guide rails 4a and 4b to the chain track carrying member 1 as such is known, it is not futher discussed. However, according to the invention two parallel extending guide rails 4a and 4b are used instead of a single guide rail typical in the prior art. A spacer block 2' arranged between the two rails 4a and 4b maintains the spacing between these two rails. Each guide rail 4a and 4b typically comprises a packet of flexible spring steel bands arranged in an upright or on-edge manner. The guide rail 4a is arranged closer to the material web W and comprises vertical side surfaces 41 and 42 facing toward and away from the material web W, respectively. The lower portions of the surfaces 41 and 42 protruding downwardly out of the clamping member 3 or spacer block 2' serve as running surfaces for the horizontal running rollers 5a and 5b, respectively. The upper edge 45 of the guide rail 4a serves as a running surface for upper support rollers 6a which carry the weight of the tenter clips. In this embodiment, the downwardly facing edge of the guide rail 4a is not utilized.

The guide rail 4b which lies closer to the chain track carrying member 1 and further from the material web W is similarly constructed and arranged. The rail 4b comprises vertical side surfaces 43 and 44 which may similarly be used as running surfaces for horizontal running rollers, but which are not used as such in this embodiment. However, the lower edge 46 of the guide rail 4b serves as a running surface for lower support roller 6b. The upper edge of the guide rail 4b is not utilized here. Therefore, the guide rail 4b may be narrower than the first guide rail 4a and only needs to protrude downwardly below the strut 2 far enough so that a support roller 6b comes into contact with the lower surface 46 for preventing, in cooperation with an upper support roller 6a, a tilting or tipping of the tenter clip. FIG. 1a further shows the arrangement of a tenter clip K with a tentering arm for clamping a material web W against the bottom Kl of the clip K. The material tentering plane E is shown by a dash-dotted line coinciding with the web W. As shown by the section line 1a-1a of FIG. 1b, the tenter clip K of FIG. 1a is sectioned through its middle. The body of the tenter clip K reaches around or enclasps the guide rail arrangement in a C-shape, whereby upper arms or struts 10 of the C-shaped tenter clip body carry at least one or more, advantageously two, upper support rollers 6a. These upper support rollers 6a roll along the upper edge 45 of the first or inner guide rail 4a thereby taking up any arising vertical forces, especially the weight of the tenter clips. A lower arm 11 of the tenter clip K is longer than the upper arm 10 and carries a lower support roller 6b. This lower support roller 6b contacts the lower edge 46 of the second or outer guide rail 4b. FIG. 1b shows that the upper edge 45 of the inner guide rail 4a supports two upper support rollers 6a and 6a' per tenter clip, whereas the lower edge 46 of the outer guide rail 4b only supports one support roller 6b. In some cases, it may be sufficient to provide only a single upper support roller 6a per tenter clip.

The lower arm 11 of the C-shaped tenter clip body K carries running or guide rollers 5a and 5b. These running or guide rollers 5a and 5b are arranged in the level of the material tentering plane E, whereby the running roller 5b contacts the outer running surface 42 of the inner guide rail 4a for taking up the horizontal tension forces arising during operation. On the other hand, when an oppositely directed compressive force arises, the inner running roller 5a contacts the inner running surface 41 of the inner guide rail 4a. FIG. 1b shows the advantageous arrangement of running rollers in two pairs per tenter clip, namely a first pair 5a, 5b, and a second pair 5a', 5b'. Each roller of a pair is arranged on opposite sides of the inner guide rail 4a. However, it is also possible to provide a different distribution or arrangement of the running or guide rollers.

Figure 1B:
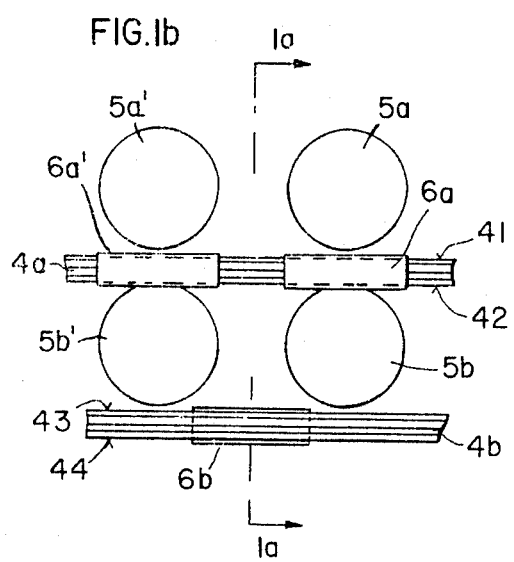
FIG. 1b is a top view schematic in the direction of arrow B of FIG. 1a showing the arrangement of the guide rails and rollers of a tenter clip.

In the example shown in Figs. 1a and 1b, the guide rails 4a and 4b, which extend in parallel to each other, are held at a defined spacing from each other by a spacer block 2' so that the outer running roller 5b can be guided between the two guide rails 4a and 4b. The guide rail 4a closer to the clip K protrudes downwardly from the spacer block 2' only far enough so that the running roller pair 5a, 5b can contact a sufficient running surface on the side surfaces 41 and 42 of the guide rail 4a. On the other hand, the guide rail 4b protrudes downwardly from the strut 2 far enough so that the lower support roller 6b lies below the plane E of the running rollers 5a and 5b.

For the sake of completeness, it should be mentioned that a plurality of tenter clips K may be joined in a known manner to form a tenter clip chain. Therefore, in FIG. 1a, a chain roller 7 is shown intermeshing with a drive sprocket 8. The components of the tentering chain guide track are arranged so that the drive sprocket 8 can freely rotate below the running rollers 5a, 5b and the support rollers 6a, 6a'. The cutting or omission of the guide rail at the turning points or drive points is thereby avoided. The arrangement according to the invention achieves a very uniform distribution of the horizontal tensile forces on the rollers and prevents the tipping or tilting of the tenter clips in a simple manner by means of the displaced arrangement of the two guide rails and the support rollers. Thus, only a few rollers are required, namely three or four running rollers and two or three support rollers.

Figure 2A:
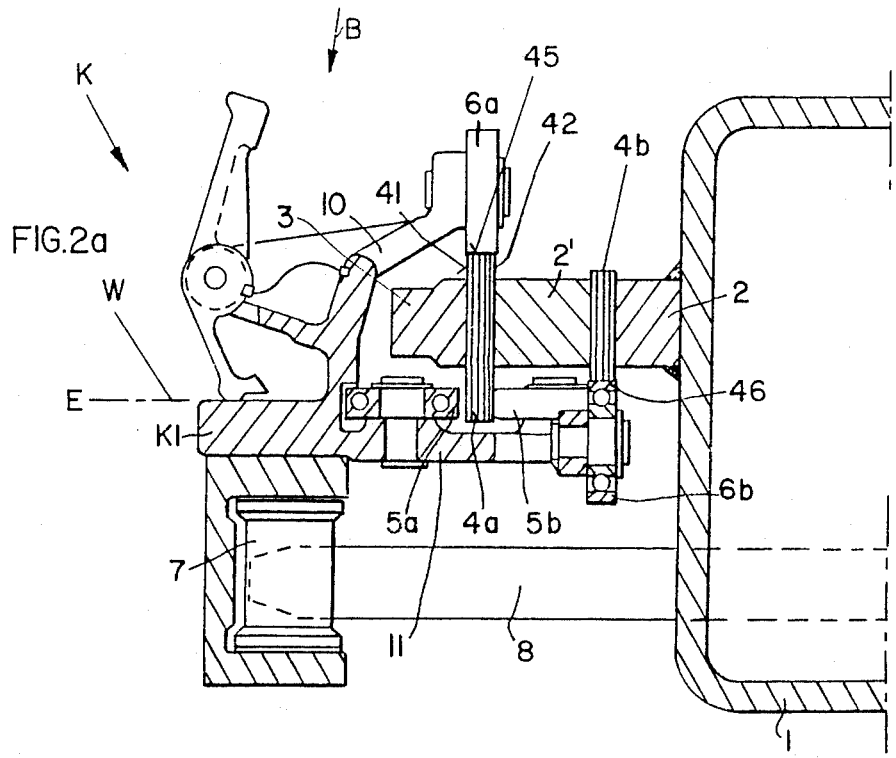
FIG. 2a is a cross-section similar to FIG. 1a, but of a different embodiment of a tentering chain guide track.
Figure 2B:
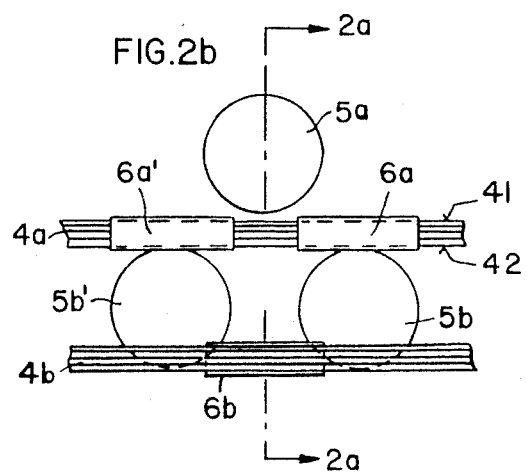
FIG. 2b is a top view schematic in the direction of the arrow B of FIG. 2a showing the arrangement of the guide rails and rollers of a tenter clip.

The example embodiment shown in FIGS. 2a and 2b has essentially the same structure as the embodiment of FIGS. 1a and 1b and will therefore be described only to the extent of the differences. One difference is seen in that the spacing between the two parallel guide rails 4a and 4b is smaller in FIG. 2a than in FIG. 1a. Thus, the embodiment of FIG. 2a comprises a shorter spacer block 2'. The outer guide rail 4b is arranged closer to the inner guide rail 4a and only protrudes a small distance below the strut 2 so that the lower edge 46 is exposed just enough to act as a contact or running surface for the lower support roller 6b. Thus, the lower edge 46 of the guide rail 4b no longer lies lower than the running rollers 5a, 5b as is shown in FIG. 1a, instead, the edge 46 is located higher than the rollers 5a and 5b. Thus, the lower support roller 6b is also moved to a higher position as can be seen in FIGS. 2a and 2b so that it partially protrudes upwardly between the running rollers 5b and 5b'.

A further difference of the embodiment of FIG. 2b is the fact that only three horizontal running rollers are required as shown. The horizontal tensile forces arising during operation are taken up by the two running rollers 5b and 5b' which contact the outer running surface 42 of the inner guide rail 4a. A single running roller 5a is arranged for taking up the oppositely directed compressive forces, whereby this roller 5a contacts the surface 41 of the guide rail 4a. If the spacing between the two running rollers 5b and 5b' is sufficiently large so that the lower support roller 6b may be arranged between the running rollers 5b and 5b', then the spacing maintained by the spacer block 2' between the two parallel guide rails 4a and 4b may be decreased still further.

FIGS. 3a and 3b show an embodiment in which the spacing between the two parallel flexible guide rails 4a and 4b has been further reduced substantially to zero. The two guide rails are now practically adjacent without any interspacing, except for at most, a thin spacer shim 9. In this example two similar guide rails 4a and 4b are so arranged that one side surface of each guide rail serves as a running surface for the running rollers 5a or 5b. The side facing the material web W for the side surface 41 of the inner guide rail 4a cooperates with the inner running roller 5a, whereas the side facing away from the material web W or the outer side surface 44 of the guide rail 4b cooperates with the outer running rollers 5b. However, as described above, the upper support roller 6a rolls on the upper edge 45 of the inner guide rail 4a and the lower support roller 6b rolls on the lower edge 46 of the guide rail 4b as in the other embodiments. The two guide rails 4a and 4b are slightly displaced vertically with respect to each other so that the upper edge 45 of the guide rail 4a protrudes above the guide rail 4b, whereas the lower edge 46 of the guide rail 4b protrudes below the guide rail 45. Hence, defined separate contact surfaces 45 or 46 are provided for the support rollers 6a or 6b, respectively. The level difference between the two guide rails may be less than 1 mm. This arrangement ensures an advantageous rolling operation and furthermore, the contact surface edges are not subject to curling roll-over damage caused by the continuous movement of the support rollers.

In addition to taking up the above described tipping or tilting moments, the three vertically arranged support rollers 6a, 6b, and 6a' also take up any other vertically directed moments and forces which may act on the tenter clips. The forces acting in a horizontal direction on the tenter clips are transmitted to the flexible guide rails through a set of running rollers comprising two roller pairs 5a, 5a' and 5b, 5b'. The number and arrangement of the rollers may also be varied in this exmaple embodiment as in the others.

In addition to the low number of rollers required according to the invention, a further advantage of all the example embodiments shown in the Figures is that the horizontal distance between the gripping edge of the tenter clips and the center line of the chain links can be made very small, whereby a smooth running operation and other good characteristics of the tentering chain is achievable e.g. a uniform stretching of the film without wrinkles. By varying or selecting the spacing between the two guide rails, that is by selecting the length of the arms of the tenter clips which carry the support rollers, the magnitude of the forces arising due to the tipping or tilting of the tenter clips can be influenced within a practical range of structural possibilities.

Although the invention has been described with reference to specific example embodiments, it will be appreciated, that it is intended to cover all modifications and equivalents within the scope of the appended claims.

What we claim is:

1. A tentering chain guide track for roller-supported tenter clamps which hold a material web in a defined horizontal tentering plane, comprising carrier means for carrying said guide track, truss means secured to said carrier means for supporting said tenter clamps, said truss means extending above and substantially in parallel to said horizontal tentering plane, a first vertically extending stationary guide rail arranged in said truss means closer to said clamps and a second vertically extending stationary guide rail arranged in said truss means closer to said carrier means, said first and second stationary guide rails extending substantially perpendicularly to said horizontal tentering plane and in parallel to each other, said first and second stationary guide rails being supported by said truss means between said clamps and said carrier means, movable support roller means secured to said tenter clamps so that rotational axes of said movable support roller means extend horizontally and so that at least one upper movable support roller bears against an upper edge of one of said stationary guide rails projecting above said truss means and so that at least one lower movable support roller bears against a lower edge of the other of said stationary guide rails projecting below said truss means for taking up vertical forces and for counteracting tilting moments exerted on said clamps, running guide roller means secured to said tenter clamps in such a position that all rotational guide roller axes extend vertically, said guide track further comprising a single central guide roller plane in which all guide rollers of said running guide roller means are located, said single central guide roller plane extending perpendicularly to said rotational guide roller axes, said single central guide roller plane substantially coinciding with said horizontal tentering plane, at least one of said first and second guide rails projecting below said truss means and just sufficiently below said single guide roller plane for cooperation with said running guide roller means for taking up horizontal forces, said guide track further comprising drive means located just below said lower movable support roller, whereby a vertically short structure is obtained.

2. The track of claim 1, wherein said first stationary guide rail closer to said clamps has lateral guide surfaces extending vertically, wherein said support roller means comprise upper support roller means bearing against said upper edge of said first stationary guide rail closer to said clamps and wherein said support roller means further comprise lower support roller means bearing against said lower edge of said second stationary guide rail closer to said carrier means.

3. The track of claim 1, wherein said second stationary guide guide rail closer to said carrier means is located on a side of said guide roller means facing away from said clamp toward said carrier means, whereby said second stationary guide rail closer to said carrier means is located between said guide roller means and said carrier means.

4. The track of claim 1, wherein second stationary guide rail closer to said carrier means is arranged between said guide roller means in such a way that the upper support roller means only contact said upper edge of said first stationary guide rail closer to said clamps, while the lower support roller means only contact the lower edge of said second stationary guide rail closer to said carrier means, and wherein said second stationary guide rail has a vertical guide surface facing away from said clamp and toward said carrier means, said vertical guide surface being effective as one running surface for said guide roller means.

5. The track of claim 4, wherein said first and second stationary guide rails substantially contact each other, wherein said first stationary guide rail closer to said clamps is displaced vertically upwardly relative to said second stationary guide rail closer to said carrier means, and wherein said second stationary guide rail is vertically displaced downwardly relative to said first stationary guide rail.

6. The track of claim 1, wherein each of said tenter clamps comprises a clamp body with upper arm means and lower arm means reaching around said truss means, wherein said upper arm means carry at least one upper support roller, and wherein said lower arm means carry at least one lower support roller located for cooperating with said second stationary guide rail which is closer to said carrier means.

7. The track of claim 6, wherein said lower arm means carry two guide rollers remote from said clamp and one guide roller close to said clamp.

8. The track of claim 6, wherein said drive menas comprise drive roller means and drive sprocket means both located below said lower arm means for avoiding an interference between said guide and support roller means on the one hand, and said drive roller means and drive sprocket means on the other hand.

9. The track of claim 1, wherein each of said first and second stationary guide rails comprises a package of a plurality of flexible spring steel leaves extending in an endless manner around the entire track.

10. The track of claim 9, wherein said flexible spring steel leaves are arranged vertically and in parallel to each other so that narrow edges of said spring steel leaves contact the respective support roller means.

11. The track of claim 1, wherein said guide roller means comprise a maximum of four guide rollers for each clamp, and wherein said support rollers comprise a maximum of three support rollers for each clamp.

* * * * *

UNITED STATES PATENT AND TRADEMARK OFFICE
CERTIFICATE OF CORRECTION

PATENT NO. : 4,736,498

DATED : April 12, 1988

INVENTOR(S) : Rudolf Langer, Karl H. Kosziech

It is certified that error appears in the above-identified patent and that said Letters Patent is hereby corrected as shown below:

Claim 2, line 6, after "clamps" insert --,--.

Claim 3, line 2, delete "guide" (second occurrence).

Claim 4, line 1, after "wherein" insert --said--.

Claim 8, line 1, replace "menas" by -- means --.

Signed and Sealed this

Sixteenth Day of August, 1988

Attest:

DONALD J. QUIGG

Attesting Officer

Commissioner of Patents and Trademarks